United States Patent [19]

Boice

[11] Patent Number: 4,879,177
[45] Date of Patent: Nov. 7, 1989

[54] MONOAXIALLY ORIENTED SHRINK FILM

[75] Inventor: Peter R. Boice, Taylors, S.C.

[73] Assignee: W. R. Grace & Co., Duncan, S.C.

[21] Appl. No.: 120,273

[22] Filed: Nov. 13, 1987

[51] Int. Cl.⁴ .............................................. B32B 7/02
[52] U.S. Cl. .................................. 428/339; 428/34.9;
428/482; 428/483; 428/516; 428/910
[58] Field of Search ............... 428/480, 339, 483, 516,
428/910, 482, 34.9, 337

[56] References Cited
U.S. PATENT DOCUMENTS 4,188,443  2/1980  Mueller et al. ...................... 428/516
4,258,166  3/1981  Canterino et al. .................. 526/348
4,355,076 10/1982  Gash ................................... 428/411
4,622,268 11/1986  Yatsu et al. ......................... 428/480
4,713,269 12/1987  Jabarin et al. ...................... 428/480
4,716,061 12/1987  Winter ................................ 428/516

Primary Examiner—Edith Buffalow
Attorney, Agent, or Firm—John J. Toney; William D. Lee, Jr.; Mark B. Quatt

[57] ABSTRACT

A coextruded multiple layer film is oriented in primarily the longitudinal direction, and comprises a core layer comprising butadiene styrene copolymer or copolyester, outer layers comprising ethylene propylene copolymer, polypropylene, or blends thereof, and intermediate layers which bond the outer layers to the core layer and comprise an ethylene copolymer.

5 Claims, 1 Drawing Sheet

MONOAXIALLY ORIENTED SHRINK FILM

BACKGROUND OF THE INVENTION

The present invention relates generally to shrink films, and more particularly to monoaxially oriented shrink films.

Various films and laminates have been proposed for use particularly as label material for the labels of beverage bottles and the like. These films or laminates are preferably monoaxially oriented in order to permit a tight label to be produced around the bottle or vessel, without the undesirable wrinkling and shrinking of the label which would occur with a biaxially oriented film. The films could also be used to produce band type seals for tamper evidence.

The label material ideally possesses several properties making it particularly useful for this end use.

For example, the material should have the required stiffness (i.e. high modulus) to permit the use of the film in a rollstock form in conjunction with label manufacturing apparatus. Lower modulus material would not be useful in such apparatus.

Suitable material should also possess surface properties that allow printing of the label with information such as verbal and graphic trademarks, ingredients, and other information directed to the contents and capacity of the vessel.

It may additionally be desirable to have a film with good optical properties.

Of interest is U.S. Pat. No. 4,188,443 issued to Mueller et al wherein a five-layer film has two inner layers comprising ethylene vinyl acetate copolymer, and skin or outer layers comprising an ethylene propylene copolymer.

Of interest is U.S. Pat. No. 4,355,076 issued to Gash wherein a monoaxially oriented polypropylene film may be laminated to a monoaxially oriented high density polyethylene film, said films produced by e.g. tubular blowing.

It is therefore an object of the present invention to provide a thermoplastic film useful in forming labels or tamper evidence bands for vessels such as bottles, cans, and the like.

It is also an object of the present invention to provide such a label which can be monoaxially oriented.

It is an additional object of the present invention to provide such a film with relatively high modulus properties.

It is still another object of the present invention to provide such a film with good printability.

It is also an object of the present invention to provide a film having excellent optical properties.

Polyvinyl chloride (PVC) materials are commonly used in many packaging applications. However, a monoaxially oriented shrink film is needed for labeling and tamper evident banding of bottles and cans. The recycling of polyester bottles and cans requires a label material with a specific gravity less than 1.0. PVC has a specific gravity greater than 1.0, making this material undesirable in such applications.

It is therefore still another object of the present invention to provide a monoaxially oriented shrink film having a composite specific gravity of less than about 1.0.

SUMMARY OF THE INVENTION

In one aspect of the present invention, a multilayer film, oriented in primarily one direction, comprises a core layer comprising a butadiene styrene copolymer; two outer layers each comprising ethylene propylene copolymer, polypropylene, or blends thereof; and two intermediate layers each bonding the core layer to a respective outer layer, and comprising an ethylene copolymer.

In another aspect of the present invention, a method for making a multilayer film comprises simultaneously coextruding a first melt stream of a butadiene styrene copolymer from a first extruder, two split melt streams of an ethylene copolymer from a second extruder, a third melt stream of ethylene propylene copolymer, polypropylene, or blends thereof from a third extruder, and a fourth melt stream of ethylene propylene copolymer, polypropylene, or blends thereof from a fourth extruder; passing the coextruded melt streams through a coextrusion die to form a tubular film; rapidly cooling the tubular film; collapsing the cooled film; slitting the cooled film to form a sheet; heating the sheet to its orientation temperature; and drawing the sheet through rolls to stretch the film in the longitudinal direction.

In still another aspect of the present invention, a multilayer film, oriented in primarily one direction, comprises a core layer comprising a copolyester; two outer layers each comprising ethylene propylene copolymer, polypropylene, or blends thereof; and two intermediate layers each bonding the core layer to a respective outer layer, and comprising an ethylene copolymer.

In yet another aspect of the present invention, a method for making a multilayer film comprises simultaneously coextruding a first melt stream of a copolyester from a first extruder, two split melt streams of an ethylene copolymer from a second extruder, a third melt stream of ethylene propylene copolymer, polypropylene, or blends thereof from a third extruder, and a fourth melt stream of ethylene propylene copolymer, polypropylene, or blends thereof from a fourth extruder; passing the coextruded melt streams through a coextrusion die to form a tubular film; rapidly cooling the tubular film; collapsing the cooled film; slitting the cooled film to form a sheet; heating the sheet to its orientation temperature; and drawing the sheet through rolls to stretch the film in the longitudinal direction.

DEFINITIONS

"Ethylene propylene copolymer" as used herein refers to a copolymer of ethylene and propylene having between about 2% and 5% by weight of the ethylene comonomer.

"Ethylene copolymer" as used herein refers to copolymers of ethylene and vinyl acetate, alkyl acrylate and alpha-olefin, and also refers to chemically modified derivatives of these materials.

"Copolyester" as used herein means a thermoplastic, film-forming copolyester such as ethylene terephthalate-glycol, terephthalic/isopthalic acid-cyclohexane dimethanol, and butylene terephthalate-tetramethylene ether terephthalate. Polyester and copolyester resins are available from suppliers such as Eastman Kodak Company.

BRIEF DESCRIPTION OF THE DRAWINGS

Further details are given below with reference to the sole drawing wherein.

DESCRIPTION OF THE PREFERRED EMBODIMENTS

Figure 1:
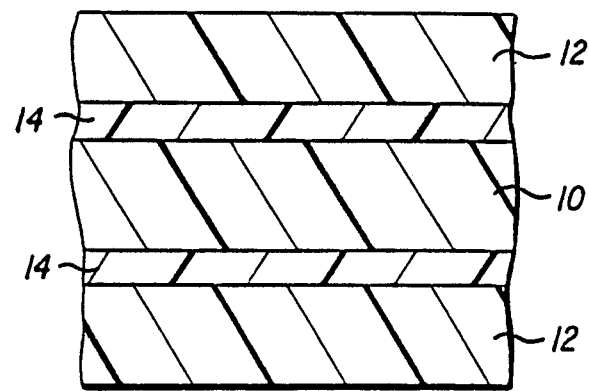
FIG. 1 is a schematic cross-section of a preferred embodiment of a multilayer film of the invention.

Referring specifically to the drawings, in FIG. 1 a schematic cross-section of a preferred embodiment of the multiply film of the invention is shown.

This film is particularly useful in forming labels for vessels such as bottles and cans.

The film structure is a multilayer composite having a core layer 10 comprising a butadiene styrene copolymer (BDS). A preferred, commercially available BDS is Phillips KR-10 having a butadiene content of 25% by weight of the copolymer.

Outer layers 12 may be either an ethylene propylene copolymer (EPC), a polypropylene (PP), or blends of these two materials. In blends, increasing the percentage of polypropylene imparts added stiffness, i.e. a higher modulus to the multilayer film. In a preferred embodiment, outer layer 12 comprises about 92% EPC and about 8% slip antiblock masterbatch in a polypropylene base.

For a stiffer film, i.e. a film with higher modulus, a more preferred blend comprises about 60% EPC and about 40% PP.

For a more flexible film, i.e. a film with lower modulus, a more preferred blend comprises about 92% EPC and about 8% PP. EPC contributes to the shrink characteristics of the film, so that the more flexible film will also exhibit better shrink characteristics such as higher free shrink at a given temperature, e.g. 200° F., than the stiffer film.

The outer layers 12 of the multilayer film each constitute preferably between about 20% and 30% of the total film thickness and more preferably about 27% of the total film thickness. These layers are preferably thicker when greater film bouyancy is desired.

A preferred EPC for outer layers 12 is one available from Fina having a 4% ethylene content. A preferred PP for outer layer 12 is Himont X-7870-39.

In the multilayer film, the outer layers are bonded to the core layer by intermediate layers 14 each comprising a copolymer of ethylene and Preferably a vinyl acetate comonomer (EVA), the copolymer having preferably between about 4% and 30% vinyl acetate by weight of the copolymer.

For stiffer films, the EVA preferably has about 12.5% vinyl acetate. A suitable resin is Elvax 3508 (du Pont).

Other preferred materials for layers 14 include ethylene alkyl acrylate, especially ethylene n-butyl acrylate copolymer; very low density polyethylene; and chemical modified polymeric adhesives having carboxylic acid or acid anhydride.

The intermediate layers 14 of the film each constitute preferably between about 5% and 15% of the total film thickness, and more preferably about 9% of the total film thickness.

The preferred butadiene styrene copolymer (BDS) of the core layer has a density of about 1.01 grams per cubic centimeter. The core layer preferably comprises between about 20% and 30% of the total film thickness.

BDS resins having minor amounts of butadiene, ranging from about 1 to 50%, are most preferred in order to provide the optimum balance of stiffness and flexibility to the film.

As indicated earlier with respect to the outer and intermediate layers, multilayer films having different modulus values can be produced by varying the composition or thickness of the core layer.

The film of the present invention is preferably made by coextrusion techniques in which melt streams of the various resins are extruded from respective extruders and passed through a die to form a tubular tape.

This tape has a thickness of preferably between about 4 and 10 mils more preferably about 6.5 mils.

The relatively thick coextruded tape is quenched for example in water, and then optionally irradiated with between about 1 and 5 megarads, and more preferably about 3 megarads of irradiation.

The coextruded tape is then slit and opened out to form a sheet. The sheet is then heated to its orientation temperature and then stretch oriented. The oriented sheet is then cooled. Preferable orientation ranges are 3:1 to 7:1, and more preferable is an orientation drawing ratio of about 5.0:1 in the longitudinal direction.

Any suitable longitudinal orientation equipment can be used for the stretching operation. A particularly useful apparatus is a unit available from Kampf. This unit includes heated rolls heated to preferably a temperature between about 180° F. and 280° F. More preferably, the rolls are heated to a temperature between about 200° F. and 250° F., and even more preferably to a temperature of about 230° F. The film is heated by passing in contact with the heated rollers. After the film has been heated, it is passed through a series of smaller rollers running at different rotational velocities to stretch the film longitudinally.

In another method of making the multilayer film, the cooled tubular film can be heated to its orientation temperature, and drawn through rollers of different speeds to stretch the film, without the need for slitting the cooled tube to form a sheet.

Although the film is referred to as a monoaxially oriented film, and is oriented primarily in the longitudinal direction, some incidental orientation is sometimes desirable in the transverse direction. This small degree of transverse direction orientation can help the film to grip a container or vessel after heat shrinking. The particular Kampf unit used in the examples does not afford significant incidental transverse orientation, but those skilled in the art will understand that suitable apparatus are available to achieve a small amount of transverse orientation if desired.

Typical film thicknesses may range from for example 0.5 to 4 mils. A preferred film thickness is about 2 mils. Increasing film thicknesses will provide more stiffness to the film in cases where a higher modulus is desired because of limitations of label-making equipment.

The butadiene styrene copolymer core layer 10 provides the stiffness and rigidity needed to emulate PVC films. The composite film has a specific gravity of about 0.934, thus providing a label material with a specific gravity less than about 1.0.

The invention may be further understood by reference to the following examples.

EXAMPLE 1

A core layer of butadiene styrene copolymer (Phillips KR-10) having a density of 1.01 grams per cubic centimeter was extruded from a first extruder in a coextrusion arrangement. Intermediate layers of a 12.5% vinyl acetate EVA (DuPont Elvax 3508) were extruded as a split stream from a second extruder. Outer layers of a blend of 92% EPC (Fina 283-98) and 8% slip/antiblock masterbatch in a PP base were extruded from third and fourth extruders respectively. The various melt streams were extruded as a tubular tape from a coextrusion die. The core layer comprised about 27% of the total thickness of the tape and resulting film. The outer layers each comprised about 27% of total film thickness, and the intermediate layers each comprised about 9% of total film thickness.

After rapid water quenching of the extruded tape, the tape was then slit and opened into a sheet, and passed through a Kampf orienting unit with heated rolls until the sheet reached its orientation temperature.

The film was not irratiated.

The film was longitudinally drawn between a series of smaller rolls at an orientation ratio of 4.0:1.0. Final film thickness was 1.5 mils. Modulus at 73° F. was 217,600 PSI (longitudinal direction) and 116,300 (transverse direction).

EXAMPLE 2

A film substantially similar in composition to that of EXAMPLE 1 has a draw ratio of 3.0:1.0.

Both examples produced films suitable for use in labeling equipment wherein the film, in rollstock form, is fed to a labeling unit. The labeling machine severs the film at a length corresponding to the final circumference of a label to be wrapped around a can, bottle, or similar vessel. An adhesive may be applied to the interior side of the film, i.e. that surface of the film which will contact the vessel, and/or the portion of the vessel itself which will bear the label.

Alternatively, labels can be pre-cut from the film and prepared as sleeves, to be inserted over for example cans or bottles and slipped onto the portion of the vessel where the label is to be placed.

In either embodiment, the film can be preprinted to carry indicia such as trademark data, contents, weight, and like information.

Suitable modifications may be made in the film, such as the introduction of desirable pigments to one or more of the resins used to prepared the multilayer film.

One particularly desirable feature of this film is its essentially monoaxial orientation. After the application of the label by either of the embodiments described above, the vessel bearing the label is passed through a hot air shrink tunnel or other shrinking means, to tighten the label around the vessel. Because of the essentially uniaxial orientation of the film, a tight fitting label is produced without significant shrinkage or warpage of the film in the transverse direction.

The film of Example 1 exhibited the following physical properties:

| Tensile At Break[1] | Longitudinal | Transverse |
|---|---|---|
| @ 73° F. | 17,600 | 3,170 |
| (PSI) | (2.09) | (1.64) |
| Elongation At Break[2] | 37.9 | 2.5 |
| @ 73° F. (%) | (2.09) | (1.64) |
| Modulus[3] @73° F. | 217,100 | 116,300 |
| (PSI) | (2.18) | (2.72) |
| Free Shrink[4] | | |
| @ 200° F. | 5 | −1 (Elongated) |
| (%) | | |
| Haze[5] @73° F. | 4.9 | |
| (%) | (2.96) | |
| Clarity[6] @73° F. | 21.2 | |
| (%) | (2.96) | |
| Gloss[7] °73° F. | 76. | |
| (45°) | (2.96) | |
| Shrink Tension[8] | | |
| Tensile At Break[1] | Longitudinal | Transverse |
| @ 200° F. | 302.23 | 56.64 |
| (PSI) | (1.92) | (2.68) |
| @ 240° F. | 527.17 | 35.67 |
| | (1.85) | (2.63) |
| @ 280° F. | 571.39 | 34.27 |
| | (2.20) | (2.59) |
| Ball Burst Impact[9] | | |
| @ 73° F. | 4.5 | |
| 1 Inch Diameter | (1.96) | |
| Sphere Head | | |
| (CM-KG) | | |

All values are averages obtained from four (4) replicate measurements.

| | | |
|---|---|---|
| 1 | ASTM D882-81 | 2 inches/minute draw rate; 4 inch initial length |
| 2 | ASTM D882-81 | |
| 3 | ASTM D882-81 | |
| 4 | ASTM D2732-70 | (Reapproved 1976) |
| 5 | ASTM D1003-61 | (Reapproved 1977) |
| 6 | ASTM D1746 | |
| 7 | ASTM D-2457-70 | (Reapproved 1977) |
| 8 | ASTM D2838-81 | |
| 9 | ASTM D3420-80 | |

Film gauges are indicated in parenthesis.

EXAMPLE 3

In an alternate embodiment, a film was coextruded with a core layer comprising a copolyester (Eastman PETG 6763).

The remainder of the film structure was substantially the same composition as in Example 1.

The film was produced substantially as described for Example 1, with an orientation ratio of 4.5:1.

The film of Example 3 had the following properties;

| Tensile At Break[1] | Longitudinal | Transverse |
|---|---|---|
| @ 73° F. | 27,750 | 3,660 |
| (PSI) | (1.62) | (1.50) |
| Elongation At Break[2] | 12.9 | 388.7 |
| @ 73° F. (%) | (1.62) | (1.50) |
| Modulus[3] @ 73° F. | 440,400 | 151,500 |
| (PSI) | (1.61) | (1.69) |
| Free Shrink[4] | | |
| @ 200° F. | 9 | −1 (Elongated) |
| (%) | | |
| Haze[5] @ 73° F. | 4.0 | |
| (%) | (1.70) | |
| Clarity[6] @73° F. | 18.0 | |
| (%) | (1.70) | |
| Gloss[7] ° 73° F. | 90. | |
| (45°) | (1.70) | |
| Shrink Tension[8] | | |
| @ 200° F. | 754.26 | 28.04 |
| (PSI) | (1.61) | (1.97) |
| @ 240° F. | 1087.48 | 40.49 |
| | (1.58) | (1.95) |
| °280° F. | 1194.65 | 69.18 |
| | (1.57) | (1.92) |
| Ball Burst Impact[9] | | |
| @ 73° F. | 5.1 | |
| 1 Inch Diameter | (1.64) | |
| Sphere Head | | |
| (CM-KG) | | |

All values are averages obtained from four (4) replicate measurements.

| 1 | ASTM D882-81 | Longitudinal - 2 inches/min. Draw rate; 4 inch initial length |
| --- | --- | --- |
| 2 | ASTM D882-81 | Transverse - 20 inches/min. Draw rate; 2 inch initial length |
| 3 | ASTM D882-81 | |
| 4 | ASTM D2732-70 | (Reapproved 1976) |
| 5 | ASTM D1003-61 | (Reapproved 1977) |
| 6 | ASTM D1746 | |
| 7 | ASTM D-2457-70 | (Reapproved 1977) |
| 8 | ASTM D2838-81 | |
| 9 | ASTM D3420-80 | |

Film gauges are indicated in parenthesis.

Although the present invention has been described in connection with preferred embodiments, it should be understood that modifications may be made without departing from the principles and scope of the invention, as those skilled in the art will readily understand. Accordingly, such modifications and variations may be practiced within the scope of the following claims.

What is claimed is:

1. A multilayer film, oriented in primarily one direction, comprising:
   (a) a core layer comprising a copolyester;
   (b) two outer layers each comprising ethylene propylene copolymer, polypropylene, or blends thereof; and
   (c) two intermediate layers each bonding the core layer to a respective outer layer, and comprising an ethylene copolymer; and
   (d) film having a shrink tension in the longitudinal direction in the range of between about 750 and 1200 p.s.i.

2. The film according to claim 1 wherein the outer layers each comprise a blend of about 92% ethylene propylene copolymer, and about 8% slip/antiblock masterbatch.

3. The film according to claim 1 wherein the intermediate layers each comprise an ethylene copolymer selected from the group consisting of ethylene vinyl acetate copolymer, ethylene alkyl acrylate copolymer, and very low density polyethylene and chemically modified polymeric adhesives.

4. A multilayer film, oriented in primarily one direction, comprising:
   (a) a cross-linked core layer comprising a copolyester;
   (b) two cross-linked outer layers each comprising ethylene propylene copolymer, polypropylene, or blends thereof; and
   (c) two cross-linked intermediate layers each bonding the core layer to a respective outer layer and comprising an ethylene copolymer; and
   (d) said film having a shrink tension in the longitudinal direction in the range of between about 750 and 1200 p.s.i.

5. The film according to claim 4 wherein the cross-linked intermediate layers each comprise an ethylene copolymer selected from the group consisting of ethylene vinyl acetate copolymer, ethylene alkyl acrylate copolymer, and very low density polyethylene.

* * * * *

UNITED STATES PATENT AND TRADEMARK OFFICE
CERTIFICATE OF CORRECTION

PATENT NO. : 4,879,177

DATED : November 7, 1989

INVENTOR(S) : Peter R. Boice

It is certified that error appears in the above-identified patent and that said Letters Patent is hereby corrected as shown below:

In column 8, line 1, before "film", add --said--.

Signed and Sealed this

Twenty-fifth Day of September, 1990

Attest:

HARRY F. MANBECK, JR.

Attesting Officer     Commissioner of Patents and Trademarks